No. 776,697. PATENTED DEC. 6, 1904.
F. A. SIEVERLING.
PUNCTURE PLUG FOR PNEUMATIC TIRES.
APPLICATION FILED APR. 4, 1903.
NO MODEL.

Witnesses:
R. E. Hamilton.
E. C. Long.

Inventor
Fred A. Sieverling
By Warren D. House,
His Attorney

No. 776,697. Patented December 6, 1904.

UNITED STATES PATENT OFFICE.

FRED A. SIEVERLING, OF KANSAS CITY, MISSOURI.

PUNCTURE-PLUG FOR PNEUMATIC TIRES.

SPECIFICATION forming part of Letters Patent No. 776,697, dated December 6, 1904.

Application filed April 4, 1903. Serial No. 151,124. (No model.)

*To all whom it may concern:*

Be it known that I, FRED A. SIEVERLING, a citizen of the United States of America, residing in Kansas City, in the county of Jackson and State of Missouri, have invented a new and useful Improvement in Puncture-Plugs for Pneumatic Tires, of which the following is a specification, reference being had therein to the accompanying drawings, forming a part thereof.

My invention relates to improvements in puncture-plugs for pneumatic tires.

The object of my invention is to provide a puncture-plug which may be quickly applied to the tire and will effectually prevent any further leakage of air at the punctured place.

My invention provides, further, a puncture-plug comprising two members adapted to be secured one upon the inside and the other upon the outside of a pneumatic tire, with the tire clamped between them, the inner member being insertible through a hole provided for the purpose in the tire, means being provided by which the members may be secured together after they have been adjusted to the proper position.

My invention provides, further, a detachable device for engaging and supporting the inner member prior to the securing to it of the outer member.

Figure 1:
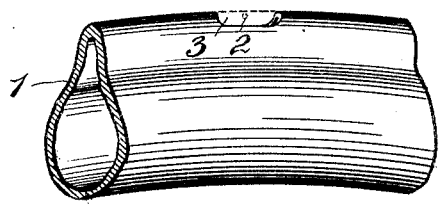
Figure 2:
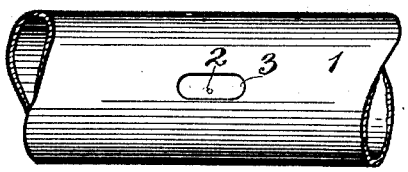
Figure 3:
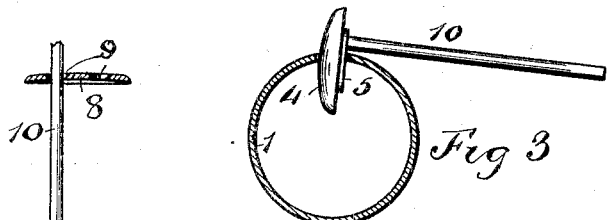
Figure 4:
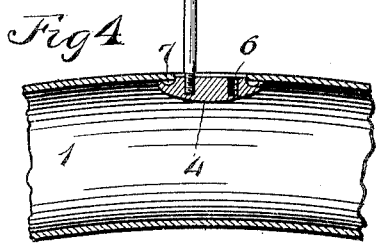
Figure 5:
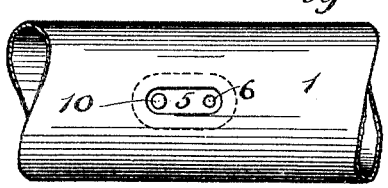
Figure 6:
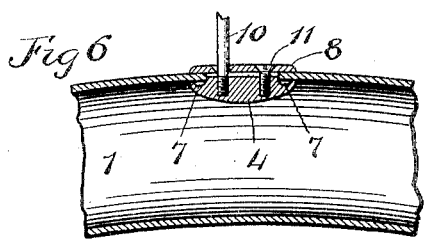
Figure 7:
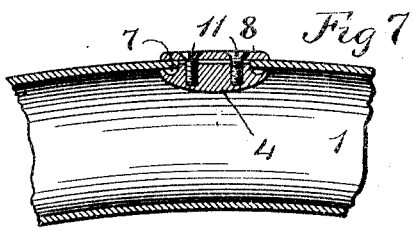
Figures 9, 11:
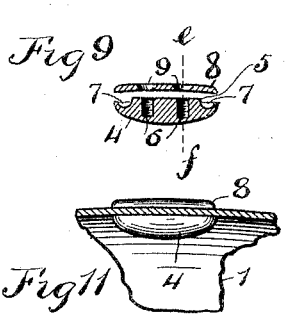
Figures 8, 12:
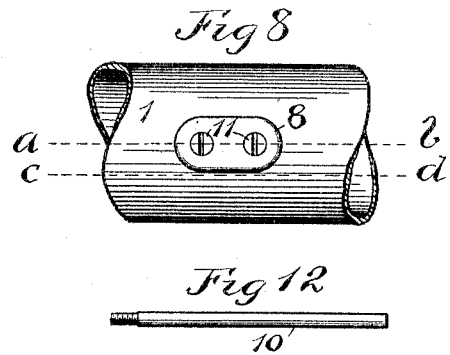
Figures 10, 13:
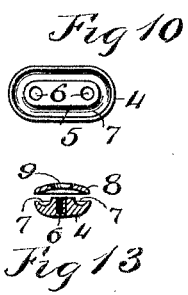

In the accompanying drawings, which illustrate my invention, Figure 1 is a side elevation view of a portion of a pneumatic tire having a portion cut out around the punctured place through which the inner member of the plug is inserted. Fig. 2 is a plan view of what is shown in Fig. 1. Fig. 3 is a cross-section view of the tire through the hole in which the inner member, shown in side elevation, is being inserted. Fig. 4 is a longitudinal vertical sectional view of a portion of the tire having inserted therein the inner member, shown in section, and supported by the threaded rod on which is being slipped the outer member, shown in vertical section. Fig. 5 is a plan view showing the inner member in position in the tire. Fig. 6 is a view similar to that shown in Fig. 4, a portion of the supporting-rod being shown and the outer member shown secured in position with one screw. Fig. 7 is a view similar to that shown in Fig. 6, the rod being removed and the second screw shown in position. Fig. 8 is a plan view of the plug secured in position. Fig. 9 is a vertical sectional view, taken on the dotted line $ab$ of Fig. 8, of the inner and outer members. Fig. 10 in a plan view of the inner member, showing the projection thereon and the encircling groove. Fig. 11 is a vertical sectional view taken on the dotted line $cd$ of Fig. 8. Fig. 12 is a side view of the supporting-rod detached. Fig. 13 is a vertical sectional view taken on the dotted line $ef$ of Fig. 9.

Similar characters of reference indicate similar parts.

1 indicates an ordinary pneumatic tire, such as is used on a bicycle. 2 indicates the place of puncture therein.

3 indicates the hole cut in the tire for the insertion of part of the puncture-plug.

4 indicates the inner member of the plug, comprising a body preferably of metal and preferably oblong or of an elliptical shape. One side of the member 4 is provided with an elliptical-shaped projection 5, in which are provided two parallel screw-threaded holes 6. Encircling the projection 5 is a continuous or endless groove 7, disposed inside the periphery of the side of the member next the tire.

8 indicates the outer plate, preferably having the same oblong or elliptical shape as the member 4 and provided with two holes 9, countersunk on their outer ends to receive therein the heads of the securing-screws and disposed so as to register with the holes 6 when the parts are in position on the tire.

10 indicates a cylindrical rod having a screw-threaded end adapted to enter and fit one of the holes 6 and insertible through the holes 9.

11 indicates two flat-headed screws insertible through and rotatable, respectively, in the holes 9 and fitted to the holes 6.

In operating my invention, when a puncture occurs—as, for instance, at 2—the tire is deflated and squeezed into the form shown in Fig. 1, after which a portion is cut out with a knife, so as to form an elliptical-shaped hole, (indicated by 3.) Cement for rubber is then placed in the groove 7 of the inner member 4, and the threaded end of the rod 10 is then screwed into one of the holes 6. The inner member is then passed sidewise, as shown in Fig. 3, into the inside of the tire through the hole 3 and then turned to the position shown in Fig. 4. In this position the projection 5 is drawn into and fits the hole 3, in which position the inner member is supported, with the grooved side next the tire, by the rod 10. The projection 5 extends but partly through the wall of the tire 1. The outer member 8 has the rod 10 slipped into one of the holes 9, as shown in Fig. 4, after which the member 8 is placed against the outside of the tire 1, as shown in Fig. 6. One of the screws 11 is then inserted through the unoccupied hole in the member 8 and into the hole 6 registering therewith. By turning the said screw in the proper direction it will tightly draw the outer and inner members toward each other until the tire is tightly clamped between the said members. The rod 10 aside from supporting the member 4 also prevents turning of the member 8 while the screw is being put into position. After the members are firmly secured the rod 10 may be detached by turning in the proper direction, when the other screw 11 is screwed into position in the hole occupied previously by the rod 10. The two screws 11 tightly compress the tire between the outer periphery of the member 4 and the under side of the member 8 and prevent any leakage occurring through the hole 3. The cement in the groove 7 provides a further safeguard against leakage. The plate or member 8 being flat upon the top and the heads of the screws 11 being below or flush with the outer side of the member 8, little obstruction is offered to the running of the tire. After the members 4 and 8 have been secured in their proper positions the tire may be again inflated.

My invention may be modified in various ways without departing from its spirit.

Having thus described my invention, what I claim, and desire to secure by Letters Patent, is—

1. A puncture-plug comprising two members adapted to be secured one upon the inner and one upon the outer side of a pneumatic tire, the inner member having a shoulder upon which the tire is adapted to be clamped, and having extending beyond said shoulder an elliptical projection adapted to enter and fit a hole provided in the tire, the said projection having two screw-threaded holes, the outer member having two holes disposed so as to register with the screw-threaded holes, and two screws for mounting in the holes of the outer member and engaging the threaded holes of the inner member.

2. A puncture-plug comprising two members adapted to be secured one upon the inside and one upon the outside of the pneumatic tire with the tire clamped between them, the inner member being provided with a projection of a form other than round adapted to enter and fit a hole provided therefor in the tire, the said member being provided also with a groove encircling the said projection for the reception of cement, and a screw rotatable in the outer member and having a screw-thread connection with the inner member.

3. A puncture-plug comprising two members adapted to be secured one upon the inside and the other upon the outside of a pneumatic tire with the tire clamped between them, the inner member being provided with a projection of a form other than round adapted to enter and fit a hole provided therefor in the tire and provided also with a groove encircling the said projection for the reception of cement, and two screws rotatable in the outer member and having a screw-thread connection with the inner member.

4. A puncture-plug comprising two members adapted to be secured one upon the inner and one upon the outer side of a pneumatic tire, the inner member having a shoulder upon which the tire is clamped, and having extending beyond said shoulder a projection having a form other than round and adapted to enter and fit a hole provided therefor in the tire, but not extending through to the outside of the tire, the said projection being provided with a screw-threaded hole, the outer member being provided with a hole adapted to register with said screw-threaded hole when the members are properly positioned, and a screw for mounting in the hole in the outer member and engaging the threaded hole in the inner member.

In testimony whereof I have signed my name to this specification in presence of two subscribing witnesses.

FRED A. SIEVERLING.

Witnesses:
 WARREN D. HOUSE,
 HENRY F. ROSE.